(12) United States Patent
Inaba et al.

(10) Patent No.: US 11,518,025 B2
(45) Date of Patent: Dec. 6, 2022

(54) ROBOT TEACHING DEVICE, ROBOT TEACHING METHOD, AND METHOD OF STORING OPERATION INSTRUCTION

(71) Applicant: FANUC CORPORATION, Yamanashi (JP)

(72) Inventors: Gou Inaba, Yamanashi (JP); Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 379 days.

(21) Appl. No.: 16/571,208

(22) Filed: Sep. 16, 2019

(65) Prior Publication Data

US 2020/0108498 A1 Apr. 9, 2020

(30) Foreign Application Priority Data

Oct. 3, 2018 (JP) .............................. JP2018-188350

(51) Int. Cl.
*B25J 9/16* (2006.01)
*B25J 9/00* (2006.01)
*B25J 9/02* (2006.01)

(52) U.S. Cl.
CPC .............. *B25J 9/163* (2013.01); *B25J 9/0081* (2013.01); *B25J 9/1664* (2013.01); *B25J 9/023* (2013.01); *G05B 2219/39001* (2013.01)

(58) Field of Classification Search
CPC ..... B25J 9/00; B25J 9/0081; B25J 9/16; B25J 9/1664; B25J 9/1656; B25J 9/023;
(Continued)

(56) References Cited

U.S. PATENT DOCUMENTS

| 4,025,838 A | * | 5/1977 | Watanabe | ............ | G05B 19/425 |
| | | | | | 700/257 |
| 4,835,730 A | | 5/1989 | Shimano et al. | | |

(Continued)

FOREIGN PATENT DOCUMENTS

| JP | S59194214 A | 11/1984 |
| JP | 05265533 A | * 10/1993 |

(Continued)

OTHER PUBLICATIONS

"Robotics & Automation—Electro-Mechanical, Using [PR] in a CALL program to eliminate wasted moves . . . (2012), YouTube" (Year: 2012).*

*Primary Examiner* — Abby Y Lin
*Assistant Examiner* — Karston G. Evans
(74) *Attorney, Agent, or Firm* — Hauptman Ham, LLP (57) ABSTRACT

A robot teaching device capable of simplifying a work involved in teaching a robot. The robot teaching device includes a position data storing section configured to store target position data for a robot; an operation instruction storing section configured to store an operation instruction for arranging the robot at a target position, the operation instruction not including the target position data; and a position data writing section configured to acquire current position data of the robot when the operation instruction is input, the position data writing section further configured to write, to the position data storing section, the current position data as the target position data together with a unique identifier, in which the identifier of the target position data is automatically given to the operation instruction being input to teach an operation to the robot.

14 Claims, 6 Drawing Sheets

(58) Field of Classification Search
CPC .... B25J 9/1679; B25J 9/1602; B25J 15/0019;
B25J 9/163; G05B 19/423; G05B 19/425;
G05B 2219/36401; G05B 2219/39001
See application file for complete search history.

(56) References Cited

U.S. PATENT DOCUMENTS

| | | | |
|---|---|---|---|
| 4,888,708 A * | 12/1989 | Brantmark | G05B 19/427 |
| | | | 700/264 |
| 6,587,743 B1 | 7/2003 | White et al. | |
| 9,718,186 B2 * | 8/2017 | Hiruma | B25J 9/1664 |
| 2010/0161562 A1 * | 6/2010 | Karajagi | G06F 16/68 |
| | | | 707/664 |
| 2014/0025910 A1 * | 1/2014 | Toshine | G06F 3/0641 |
| | | | 711/162 |
| 2015/0094855 A1 * | 4/2015 | Chemouny | B25J 9/163 |
| | | | 901/3 |
| 2015/0316388 A1 * | 11/2015 | Xie | G01C 21/32 |
| | | | 701/410 |
| 2019/0099885 A1 * | 4/2019 | Teraoka | B23K 3/02 |
| 2019/0370363 A1 * | 12/2019 | Hersans | H04L 63/0428 |

FOREIGN PATENT DOCUMENTS

| | | | |
|---|---|---|---|
| JP | H5265533 A | | 10/1993 |
| JP | H09323278 A | * | 12/1997 |
| JP | 2004344998 A | | 12/2004 |
| JP | 2006-167884 A | | 6/2006 |
| JP | 2007242054 A | | 9/2007 |
| JP | 201145913 A | | 3/2011 |
| JP | 2015098076 A | * | 11/2015 |

* cited by examiner

FIG. 6 ions to a robot are known (e.g., JP 2006-167884 A). In the
ROBOT TEACHING DEVICE, ROBOT TEACHING METHOD, AND METHOD OF STORING OPERATION INSTRUCTION

RELATED APPLICATIONS

The present application claims priority of Japanese Application Number 2018-188350, filed Oct. 3, 2018, the disclosure of which is hereby incorporated by reference herein in its entirety.

BACKGROUND OF THE INVENTION

1. Field of the Invention

The present invention relates to a robot teaching device a robot teaching method, and a method of storing an operation instruction.

2. Description of the Related Art

Robot teaching devices for teaching predetermined operations to a robot are known (e.g., JP 2006-167884 A). In the related art, it has been demanded to simplify the operations involved in teaching the robot.

SUMMARY OF THE INVENTION

In an aspect of the present disclosure, a robot teaching device includes a position data storing section configured to store target position data for a robot; an operation instruction storing section configured to store an operation instruction for arranging the robot at a target position, the operation instruction not including the target position data; and a position data writing section configured to acquire current position data of the robot when the operation instruction is input, and write onto the position data storing section the current position data, as the target position data, together with a unique identifier, wherein the robot teaching device is configured to teach an operation to the robot by automatically giving the unique identifier of the target position data to the input operation instruction.

In another aspect of the present disclosure, a robot teaching method includes acquiring current position data of a robot when an operation instruction, that does not include target position data for the robot, is input; storing the current position data, as the target position data, together with a unique identifier; and teaching an operation to the robot by automatically giving the unique identifier of the target position data to the input operation instruction.

In still another aspect of the present disclosure, a robot teaching device includes a position data storing section configured to store target position data for a robot together with a unique identifier; an operation instruction storing section configured to store an operation instruction for arranging the robot at a target position, the operation instruction not including the target position data; and an operation instruction writing section configured to, if a newly-input target position data matches the target position data stored in the past in the position data storing section, automatically give to an input operation instruction the identifier of the target position data stored in the past, and write onto the operation instruction storing section the input operation instruction in the form of an operation instruction which does not include the target position data.

In still another aspect of the present disclosure, a method includes storing an operation instruction for arranging a robot at a target position, the operation instruction not including target position data of the robot; if a newly-input target position data matches the target position data stored in the past together with a unique identifier, automatically giving to an input operation instruction the identifier of the target position data stored in the past; and storing the input operation instruction in the form of an operation instruction which does not include the target position data.

According to the present disclosure, an operator is not required to input target position data and write an identifier for an operation instruction each time the operator inputs the operation instruction, and accordingly, it is possible to reduce the number of works for teaching an operation to a robot. Due to this, it is possible to simplify the work involved in teaching the robot.

DETAILED DESCRIPTION

Embodiments of the present disclosure will be described in detail below with reference to the drawings. Note that, in the various embodiments to be described below, the same reference numerals will be given to similar components, and redundant descriptions thereof will be omitted. First, a robot teaching device 10 according to an embodiment will be described with reference to FIGS. 1 and 2. The robot teaching device 10 is for teaching an operation to a robot 100.

Figure 1:
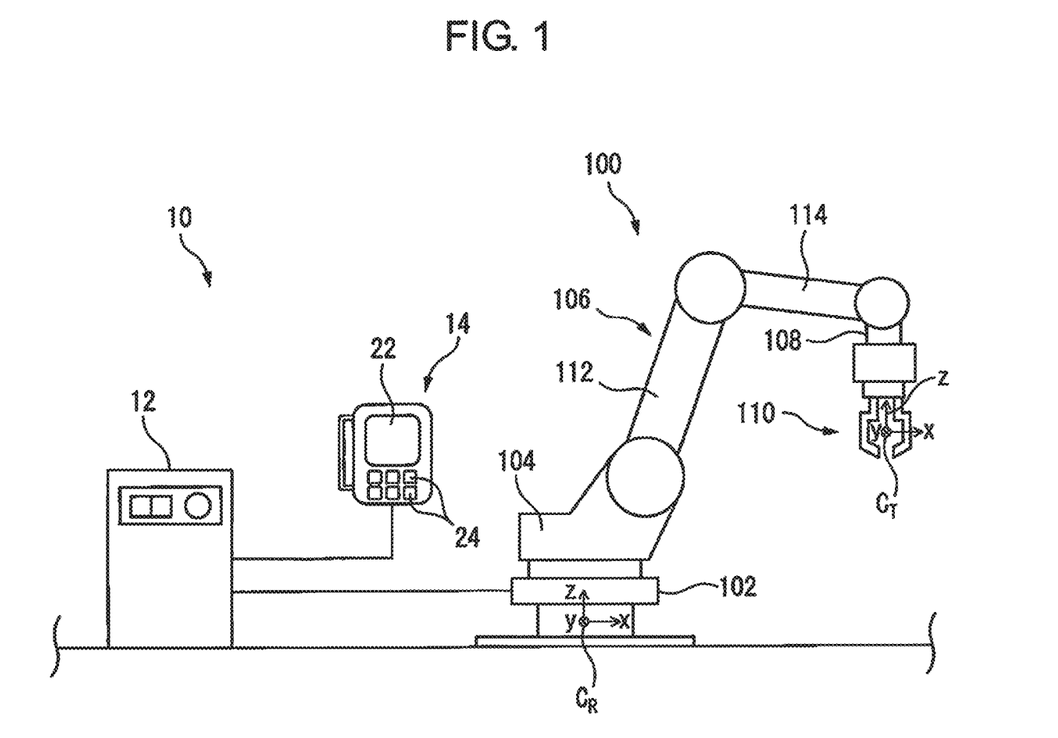
FIG. 1 is a diagram illustrating a robot teaching device according to an embodiment.

The robot 100 is a vertical articulated robot, and includes a robot base 102, a turning body 104, a robot arm 106, a wrist 108, and an end effector 110. The robot base 102 is fixed on a floor of a work cell. The turning body 104 is provided at the robot base 102 so as to be rotatable about a vertical axis. The robot arm 106 includes a lower arm 112 rotatably coupled to the turning body 104, and an upper arm 114 rotatably coupled to a distal end of the lower arm 112.

The wrist 108 is coupled to a distal end of the upper arm 114. The end effector 110 is attached to the wrist 108, and the wrist 108 rotatably supports the end effector 110. The end effector 110 is a robotic hand, a welding torch, a paint applicator, etc., and carries out a predetermined work on a workpiece.

Figure 2:
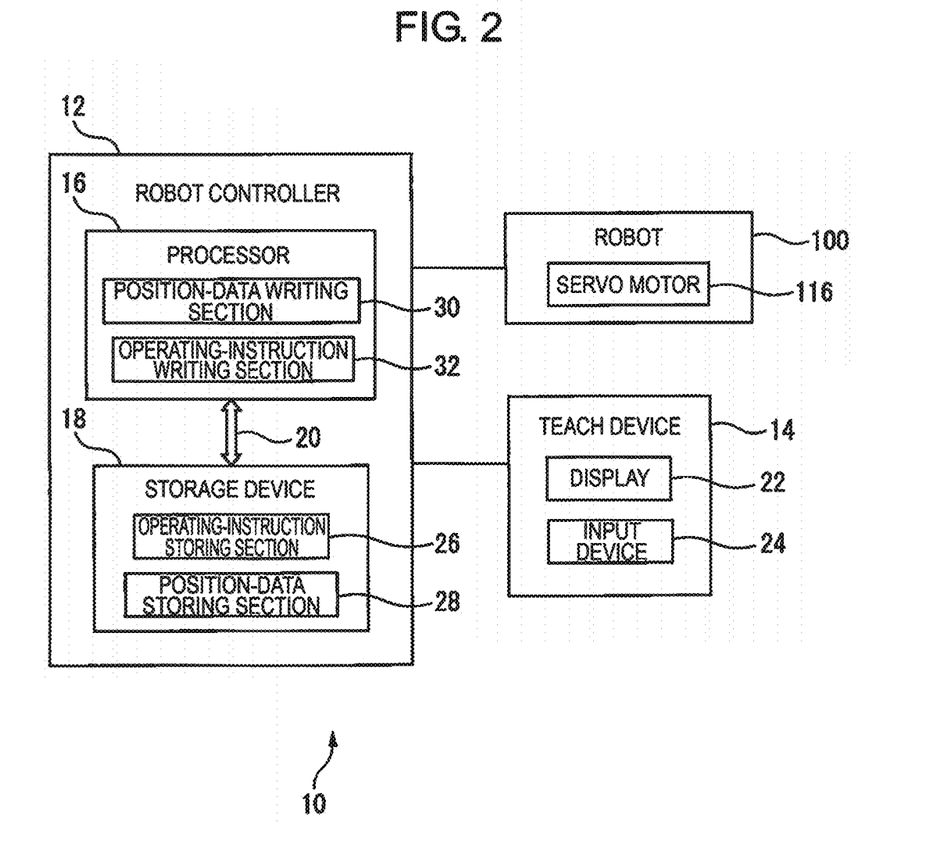
FIG. 2 is a block diagram illustrating the robot teaching device illustrated in FIG. 1.

The robot 100 includes a plurality of servomotors 116 (FIG. 2). These servomotors 116 are built in the respective components (the robot base 102, the turning body 104, the robot arm 106, and the wrist 108) of the robot 100, and rotate these components about the drive axes.

The robot teaching device 10 includes a robot controller 12 and a teach device 14. The robot controller 12 includes a processor 16 and a storage device 18, and controls the robot 100. The processor 16 is e.g. a CPU or GPU, and executes various types of processing described later. The storage device 18 includes e.g. a ROM and RAM, and stores various types of data. The processor 16 and the storage device 18 are communicably connected to each other via a bus 20.

A robot coordinate system $C_R$ is set for the robot 100. In the present embodiment, the robot coordinate system $C_R$ is set such that the origin thereof is positioned at the robot base 102, the z-axis thereof is parallel to the vertical direction, and the turning body 104 is rotated about the z-axis.

On the other hand, a tool coordinate system $C_T$ is set for the hand tip (i.e., the end effector 110) of the robot 100. The tool coordinate system $C_T$ is for defining the position of the end effector 110 in the robot coordinate system $C_R$. Note that, in the present disclosure, the "position" may mean the position and orientation.

The robot controller 12 generates a command to each servomotor 116 in accordance with an operation instruction described later, which is stored in the storage device 18, and operates each component of the robot 100 so as to sequentially arrange the end effector 110 at a plurality of target positions. Accordingly, the robot 100 moves along a movement path defined by the plurality of target positions.

When arranging the end effector 110 at one target position, the robot controller 12 first sets the tool coordinate system $C_T$ in the robot coordinate system $C_R$. The robot controller 12 then operates the robot 100 with reference to the robot coordinate system $C_R$ so as to arrange the end effector 110 at the target position defined by the set tool coordinate system $C_T$. In such a manner, the end effector 110 is arranged at the target position in the robot coordinate system $C_R$.

In the present embodiment, the teach device 14 is e.g. a hand-held teach pendant, and includes a processor (CPU, GPU, etc.), a storage device (RAM, ROM, etc.), a display 22, and an input device 24. The display 22 is e.g. an LCD or an organic EL display, and displays data as an image. The input device 24 is e.g. a keyboard having a plurality of operation keys, and receives an input operation by an operator.

The teach device 14 is communicably connected to the robot controller 12 in a wireless or wired manner. The operator can arrange the robot 100 at any position through the robot controller 12 by operating the input device 24 of the teach device 14 (so-called, jog operation).

Also, the operator can input an operation instruction for the robot 100 by operating the input device 24 of the teach device 14. The teach device 14 receives the input of the operation instruction for the robot 100 by the operator, and sends to the robot controller 12 the input information on the operation instruction.

The storage device 18 stores the operation instruction for arranging the robot 100 at the target position. Thus, in the present embodiment, the storage device 18 functions as an operation instruction storing section 26 (FIG. 2) configured to store the operation instruction. Table 1 below shows an example of a set of operation instructions to be stored in the storage device 18.

TABLE 1

| OPERATION INSTRUCTION | |
|---|---|
| 1 | MOVE POSITION [1] |
| 2 | MOVE POSITION [2] |
| 3 | MOVE POSITION [3] |
| . | . |
| . | . |
| . | . |
| n | MOVE POSITION [m] |

In the example of Table 1, from the first row of operation instruction including the character string "MOVE POSITION [1]" to the n-th row of operation instruction including the character string "MOVE POSITION [m]", a total of "n" rows of operation instructions are stored.

The storage device 18 further stores target position data for the robot 100. Thus, in the present embodiment, the storage device 18 functions as a position data storing section 28 (FIG. 2) configured to store the target position data. Note that, one ROM (or RAM) of the storage device 18 may function as the operation instruction storing section 26 and the position data storing section 28. Alternatively, a first ROM (or RAM) of the storage device 18 may function as the operation instruction storing section 26, while a second ROM (or RAM) of the storage device 18 may function as the position data storing section 28. Table 2 below shows an example of a database of the target position data.

TABLE 2

| TARGET POSITION DATA | | | | | | |
|---|---|---|---|---|---|---|
| ID | X | Y | Z | W | P | R |
| 1 | $X_1$ | $Y_1$ | $Z_1$ | $W_1$ | $P_1$ | $R_1$ |
| 2 | $X_2$ | $Y_2$ | $Z_2$ | $W_2$ | $P_2$ | $R_2$ |
| 3 | $X_3$ | $Y_3$ | $Z_3$ | $W_3$ | $P_3$ | $R_3$ |
| . | . | . | . | . | . | . |
| . | . | . | . | . | . | . |
| m | $X_m$ | $Y_m$ | $Z_m$ | $W_m$ | $P_m$ | $R_m$ |

In the example shown in Table 2, coordinates (X, Y, Z, W, F, R) are stored as the target position data. In the present embodiment, the target position data (X, Y, Z, W, F, R) defines the position (i.e., the origin and the direction of each axis) of the tool coordinate system $C_T$ to be set in the robot coordinate system $C_R$ when the end effector 110 is arranged at the target position.

More specifically, the coordinate X indicates the x-coordinate of the origin of the tool coordinate system $C_T$ in the robot coordinate system $C_R$, the coordinate Y indicates the y-coordinate of the origin of the tool coordinate system $C_T$ in the robot coordinate system $C_R$, and the coordinate Z indicates the z-coordinate of the origin of the tool coordinate system $C_T$ in the robot coordinate system $C_R$. By these coordinates X, Y, and Z, the position of the tool coordinate system $C_T$ (i.e., the end effector 110) in the robot coordinate system $C_R$ is defined.

On the other hand, the coordinate W indicates the rotation angle of the tool coordinate system $C_T$ about the x-axis of a reference coordinate system (e.g., the robot coordinate system $C_R$), the coordinate P indicates the rotation angle of the tool coordinate system $C_T$ about the y-axis of the reference coordinate system, and the coordinate R indicates the rotation angle of the tool coordinate system $C_T$ about the z-axis of the reference coordinate system. By these coordinates W, P, and R, the orientation of the tool coordinate system $C_T$ (i.e., the end effector 110) is defined.

A unique identifier ID is assigned to each target position data. In the example shown in Table 2, the identifier ID is set as a number from "1" to "m". For example, the m-th target position data, to which ID=m is assigned, has coordinates $(X_m, Y_m, Z_m, W_m, P_m, R_m)$.

In this way, in the database shown in Table 2, a total of "m" pieces of target position data from the first target position data $(X_1, Y_1, Z_1, W_1, P_1, R_1)$ to the north target position data $(X_m, Y_m, Z_m, W_m, P_m, R_m)$ are stored so as to be identifiable by their unique identifiers.

When operating the robot 100, the robot controller 12 sequentially reads out the first row to n-th row of operation instructions shown in Table 1, and causes the robot 100 to execute the operations defined by these operation instructions. For example, the n-th row of operation instruction: "MOVE POSITION [m]" causes the robot 100 to carry out an operation of arranging the end effector 110 at the m-th target position identified by ID=m.

The "POSITION [m]" in the n-th row of operation instruction is a character string quoting the identifier ID=m of the m-th target position data. When the robot controller 12 reads out the character string of "POSITION [m]," the robot controller 12 refers to the database shown in Table 2, that is stored in the storage device 18 (position data storing section 28), and reads out the m-th target position data ($X_m$, $Y_m$, $Z_m$, $W_m$, $P_m$, $R_m$) to which the identifier ID=m is given.

The robot controller 12 then sets the tool coordinate system $C_T$ at the m-th target position defined by the m-th target position data ($X_m$, $Y_m$, $Z_m$, $W_m$, $P_m$, $R_m$), and operates the robot 100 so as to arrange the end effector 110 at the m-th target position defined by the set tool coordinate system $C_T$. Thus, in the present embodiment, the n-th row of operation instruction includes the character string quoting the identifier ID=m of the m-th target position data, and does not include the m h target position data ($X_m$, $Y_m$, $Z_m$, $W_m$, $P_m$, $R_m$).

Next, a method of teaching the robot 100 using the robot teaching device 10 will be described. When teaching the robot 100, an operator first operates the teach device 14 to carry out jogging of the robot 100 so as to arrange the end effector 110 at the target position to be taught.

The operator then operates the input device 24 to input an operation instruction for teaching an operation to the robot 100. As an example, the robot teaching device 10 displays on the display 22 an operating teaching button for inputting the operation instruction. In this case, the operator operates the input device 24 so as to manipulate the operating teaching button displayed on the display 22 to input the operation instruction.

As another example, in the teach device 14, one operation key of the input device 24 may be assigned as the operating teaching button. In this case, the operator operates the input device 24 as the operating teaching button so as to input the operation instruction. The processor of the teach device 14 receives the input of the operation instruction by the operator via the input device 24, and sends the input information of the operation instruction to the robot controller 12.

Upon receiving the input of the operation instruction by the operator, the processor 16 of the robot controller 12 acquires the current position data of the robot 100 at this time. More specifically, the processor 16 acquires the coordinates ($X_{m+1}$, $Y_{m+1}$, $Z_{m+1}$, $W_{m+1}$, $P_{m+1}$, $R_{m+1}$) of the end effector 110 at this time, as the current position data of the robot 100. Note that the processor 16 may acquire the rotation angle of each servomotor 116 when receiving the input of the operation instruction, and calculate the coordinates ($X_{m+1}$, $Y_{m+1}$, $Z_{m+1}$, $W_{m+1}$, $P_{m+1}$, $R_{m+1}$) of the end effector 110 on the basis of the rotation angle.

The processor 16 gives a unique identifier "m+1" to the acquired current position data ($X_{m+1}$, $Y_{m+1}$, $Z_{m+1}$, $W_{m+1}$, $P_{m+1}$, $R_{m+1}$), and writes this current position data ($X_{m+1}$, $Y_{m+1}$, $Z_{m+1}$, $W_{m+1}$, $P_{m+1}$, $R_{m+1}$) onto the storage device 18 as new target position data. As a result, the new target position data ($X_{m+1}$, $Y_{m+1}$, $Z_{m+1}$, $W_{m+1}$, $P_{m+1}$, $R_{m+1}$), to which the identifier "m+1" is assigned, is added to the database of the target position data stored in the storage device 18, as shown in Table 3 below.

TABLE 3

| TARGET POSITION DATA | | | | | | |
|---|---|---|---|---|---|---|
| ID | X | Y | Z | W | P | R |
| 1 | $X_1$ | $Y_1$ | $Z_1$ | $W_1$ | $P_1$ | $R_1$ |
| 2 | $X_2$ | $Y_2$ | $Z_2$ | $W_2$ | $P_2$ | $R_2$ |
| 3 | $X_3$ | $Y_3$ | $Z_3$ | $W_3$ | $P_3$ | $R_3$ |
| . | . | . | . | . | . | . |
| . | . | . | . | . | . | . |
| . | . | . | . | . | . | . |
| m | $X_m$ | $Y_m$ | $Z_m$ | $W_m$ | $P_m$ | $R_m$ |
| m + 1 | $X_{m+1}$ | $Y_{m+1}$ | $Z_{m+1}$ | $W_{m+1}$ | $P_{m+1}$ | $R_{m+1}$ |

In this manner, in the present embodiment, the processor 16 functions as a position data writing section 30 (FIG. 2) configured to acquire the current position data of the robot when the operation instruction is input, and write onto the position data storing section 28 (i.e., the storage device 18) the current position data, as the target position data, together with the identifier.

Further, upon receiving the input of the operation instruction, the processor 16 automatically gives the identifier "m+1" of the new target position data ($X_{m+1}$, $Y_{m+1}$, $Z_{m+1}$, $W_{m+1}$, $P_{m+1}$, $R_{m+1}$) to the input operation instruction, and automatically writes onto the storage device 18 as a new operation instruction "MOVE POSITION [m+1]." As a result, the new operation instruction "MOVE POSITION [m+1]" is added in the (n+1)-th row, as shown in Table 4 below.

TABLE 4

| OPERATION INSTRUCTION | |
|---|---|
| 1 | MOVE POSITION [1] |
| 2 | MOVE POSITION [2] |
| 3 | MOVE POSITION [3] |
| . | . |
| . | . |
| . | . |
| n | MOVE POSITION [m] |
| n + 1 | MOVE POSITION [m + 1] |

Thus, in the present embodiment, the processor 16 functions as an operation instruction writing section 32 configured to writes the input operation instruction onto the operation instruction storing section 26 (i.e., the storage device 18). In this manner, an operation (i.e., an operation of arranging the end effector 110 at the (m+1)-th target position) defined by the new operation instruction is taught to the robot 100.

As described above, in the present embodiment, the processor 16 (the position data writing section 30) acquires the current position data of the robot 100 when the operation instruction is input by the operator, and writes onto the position data storing section 28, as the new target position data, together with the new identifier. Then, the processor 16 teaches the operation to the robot 100 by automatically giving the new identifier to the input operation instruction.

Due to this configuration, it is not necessary for the operator to manually input the target position data and give the identifier to the operation instruction every time he/she inputs the operation instruction, and therefore the number of processes necessary for teaching the operation to the robot 100 can be reduced. Thus, it is possible to simplify the work involved in teaching the robot 100.

Next, another function of the robot teaching device 10 will be described. As described above, upon receiving the input of the operation instruction by an operator via the teach device 14, the processor 16 functions as the position data writing section 30 to acquire the current position data ($X_{m+1}$, $Y_{m+1}$, $Z_{m+1}$, $W_{m+1}$, $P_{m+1}$, $R_{m+1}$) of the robot 100 at this time.

Then, the processor 16 determines whether the newly acquired current position data ($X_{m+1}$, $Y_{m+1}$, $Z_{m+1}$, $W_{m+1}$, $P_{m+1}$, $R_{m+1}$) matches the first to m-th target position data stored in the storage device 18 (position data storing section 28) in the past. As an example, the processor 16 determines whether the coordinates $X_{m+1}$, $Y_{m+1}$, $Z_{m+1}$, $W_{m+1}$, $P_{m+1}$, and $R_{m+1}$ of the acquired current position data are respectively within ranges of thresholds predetermined for the individual coordinates X, Y, Z, W, P, and R of each of the first to m-th target position data.

For example, the ranges of thresholds may be set to be 95% to 105% of the respective coordinates X, Y, Z, W, P, and R of each of the first to m-th target position data (i.e., [X×0.95, X×1.05], [Y×0.95, Y×1.05], [Z×0.95, Z×1.05], [W×0.95, W×1.05], [P×0.95, P×1.05], [R×0.95, R×1.05]).

When the processor 16 determines that the coordinates $X_{m+1}$, $Y_{m+1}$, $Z_{m+1}$, $W_{m+1}$, $P_{m+1}$, and $R_{m+1}$ of the acquired current position data are respectively within the corresponding ranges of thresholds, the processor 16 determines that the current position data ($X_{m+1}$, $Y_{m+1}$, $Z_{m+1}$, $W_{m+1}$, $P_{m+1}$, $R_{m+1}$) matches the target position data stored in the storage device 18 in the past.

Note that the processor 16 may determine whether at least one of the coordinates $X_{m+1}$, $Y_{m+1}$, $Z_{m+1}$, $W_{m+1}$, $P_{m+1}$, $R_{m+1}$ of the acquired current position data (e.g., $X_{m+1}$, $Y_{m+1}$, and $Z_{m+1}$) is in the range of thresholds predetermined for at least one of the corresponding coordinates X, Y, Z, W, P, and R (e.g., X, Y, and Z) of each of the first to m-th target position data.

Alternatively, the processor 16 may determine that the current position data matches the target position data stored in the past, only if at least one of the coordinates $X_{m+1}$, $Y_{m+1}$, $Z_{m+1}$, $W_{m+1}$, $P_{m+1}$, $R_{m+1}$ of the acquired current position data (e.g., $X_{m+1}$, $Y_{m+1}$, and $Z_{m+1}$) completely matches at least one of the corresponding coordinates X, Y, Z, W, P, and R (e.g., X, Y, and Z) of each of the first to m-th target position data.

As another example, the processor 16 calculates a distance δ between the position ($X_{m+1}$, $Y_{m+1}$, $Z_{m+1}$) in the robot coordinate system $C_R$ of the acquired current position data and the position (X, Y, Z) in the robot coordinate system $C_R$ of each of the first to m-th target position data stored in the storage device 18 in the past (i.e., $\delta=((X_{m+1}-X)^2+(Y_{m+1}-Y)^2+(Z_{m+1}-Z)^2)^{1/2}$).

Then, the processor 16 determines whether the calculated distance δ is within a range of predetermined thresholds [0, $\delta_{th}$]. When the processor 16 determines that the distance δ is within the range [0, $\delta_{th}$] (i.e., $0 \leq \delta \leq \delta_{th}$), the processor 16 determines that the acquired current position data matches the target position data stored in the storage device 18 in the past.

Note that, in addition to the distance δ, the processor 16 may further calculate differences $\phi_W$ between the coordinates ($W_{m+1}$, $P_{m+1}$, $R_{m+1}$) indicative of the orientation of the acquired current position data and the coordinates (W, P, R) indicative of the orientation of each target position data stored in the storage device 18 in the past (i.e., $\phi_W=W_{m+1}-W$, $\phi_P=P_{m+1}-P$, $\phi_R=R_{m+1}-R$).

Then, the processor 16 may determine whether the differences $\phi_W$, $\phi_P$, and $\phi_R$ are respectively in ranges [0, $\phi_{Wth}$], [0, $\phi_{Pth}$], and [0, $\phi_{Rth}$] predetermined for the individual differences. In this case, the processor 16 may determine that the acquired current position data matches the target position data stored in the storage device 18 in the past when the processor 16 determines that the distance δ is in the range [0, $\delta_{th}$] and the differences $\phi_W$, $\phi_P$, and $\phi_R$ are in the ranges [0, $\phi_{Wth}$]: [0, $\phi_{Pth}$], and [0, $\phi_{Rth}$] respectively.

When the processor 16 determines that the acquired current position data does not match the target position data stored in the past, the processor 16 functions as the position data writing section 30 to write onto the storage device 18 the current position data together with a new unique identifier, similarly as the above-described embodiment.

On the other hand, when the processor 16 determines that the acquired current position data matches the target position data stored in the past, the processor 16 automatically gives the identifier of the target position data stored in the past to the operation instruction for which the current position data is acquired, without writing the current position data onto the storage device 18.

For example, assume that the processor 16 determines that the acquired current position data matches the third target position data. ($X_3$, $Y_3$, $Z_3$, $W_3$, $P_3$, $R_3$) in the database of Table 2 that has been stored in the storage device 18 in the past. In this case, the processor 16 automatically adds the identifier "3" of the third target position data ($X_3$, $Y_3$, $Z_3$, $W_3$, $P_3$, $R_3$) to the input operation instruction, and writes onto the storage device 18 the operation instruction "MOVE POSITION 1" so as to add it to the (n+1)-th row of the operation instructions shown in Table 4.

As described above, in the present embodiment, the processor 16 does not write the current position data onto the storage device 18 when the processor 16 determines that the acquired current position data matches the target position data stored in the storage device 18 in the past. Due to this configuration, it is possible to prevent a plurality of target position data, that substantially overlap each other, from being redundantly stored in the storage device 18, and effectively make use of the already-stored target position data. Whereby, the amount of data in the database storing the target position data can be reduced, and accordingly, it is possible to reduce the capacity of the storage device 18.

Furthermore, if the database of the target position data is displayed on the display so as to be viewable for an operator, it is possible to avoid displaying multiple target position data substantially match each other, whereby the maintenance of the database can be facilitated. Further, if the target position is displayed on the display as an image, it is possible to omit unnecessary target positions, whereby the visibility of the image can be improved.

Note that, multiple target position data, among the target position data stored in the storage device 18, may be determined to match the acquired current position data. For example, if the processor 16 calculates the above-described distance δ, there may be multiple target position data, the distance δ of each of which is in the range [0, $\delta_{th}$]. In this case, the processor 16 may select one target position data, the distance δ of which is closest to zero, and automatically give the identifier of the one target position data to the input operation instruction.

Alternatively, the processor 16 may provide an operator with the multiple target position data, the distance δ of which are in the range [0, $\delta_{th}$], as an image in a form of list. For example, the processor 16 may send a command to the teach device 14, in response to which, the teach device 14 may display the list of the multiple target position data on the display 22.

Then, the operator may operate the input device 24 so as to input a signal for selecting desired target position data from the displayed multiple target position data. Then, the processor 16 may receive the input and automatically give the identifier of the target position data selected by the operator to the input operation instruction.

Alternatively, the processor 16 may display the list of the multiple target position data on the display (not illustrated) provided at the robot controller 12. Then, the operator may operate the input device (e.g., a keyboard, etc.) provided at the robot controller 12 so as to input a signal for selecting desired target position data from the displayed multiple target position data. Then, the processor 16 may automatically give the identifier of the target position data selected by the operator to the input operation instruction.

Next, still another feature of the robot teaching device 10 will be described. Assume that the storage device 18 stores therein the databases of the target position data shown in Table 3 and the operation instruction shown in Table 4, and that an operator operates the teach device 14 so as to add a new operation instruction to a row between the n-th row of operation instruction "MOVE POSITION [m]" and the (n+1)-th row of operation instruction "MOVE POSITION [m+1]" shown in Table 4.

That is, the n-th row of operation instruction "MOVE POSITION [m]" and the (n+1)-th row of operation instruction "MOVE POSITION [m+1]" have already been taught prior to the new operation instruction. In this case, instead of acquiring the current position data of the robot 100 when the new operation instruction is input, the processor 16 calculates an intermediate position between the m-th target position data $(X_m, Y_m, Z_m, W_m, P_m, R_m)$ with the identifier ID=m and the (m+1)-th target position data $(X_{m+1}, Y_{m+1}, Z_{m+1}, W_{m+1}, P_{m+1}, R_{m+1})$ with the identifier ID=m+1, wherein the m-th target position data is instructed by the n-th row of operation instruction, while the (m+1)-th target position data is instructed by the (n+1)-th row of operation instruction.

As an example, the processor 16 calculates, as the intermediate position, midpoint coordinates $((X_{m+1}-X_m)/2, (Y_{m+1}-Y_m)/2, (Z_{m+1}-Z_m)/2)$ between the coordinates $(X_m, Y_m, Z_m)$ in the robot coordinate system $C_R$ included in the m-th target position data and the coordinates $(X_{m+1}, Y_{m+1}, Z_{m+1})$ in the robot coordinate system $C_R$ included in the (m+1)-th target position data.

On the other hand, as for coordinates (W, P, R) indicating the orientation of the intermediate position, the processor 16 employs the coordinates $(W_m, P_m, R_m)$ of the orientation of the m-th target position data. Thus, in the present example, the processor 16 calculates the position data $((X_{m+1}-X_m)/2, (Y_{m+1}-Y_m)/2, (Z_{m+1}-Z_m)/2), W_m, P_m, R_m)$ of the intermediate position.

Note that the processor 16 may employ the coordinates $(W_{m+1}, P_{m+1}, R_{m+1})$ of the (m+1)-th target position data as coordinates (W, P, R) indicating the orientation of the intermediate position. In this case, the processor 16 calculates position data $((X_{m+1}-X_m)/2, (Y_{m+1}-Y_m)/2, (Z_{m+1}-Z_m)/2, W_{m+1}, P_{m+1}, R_{m+1})$ of the intermediate position.

As another example, the processor 16 may further calculate the coordinates of the intermediate orientation between the orientation defined by the m-th target position data and the orientation defined by the (m+1)-th target position data, in addition to the coordinates of the midpoint of the two target positions described in the above example.

More specifically, the processor 16 calculates the coordinates $(W_m+(W_{m+1}-W_m)/2, P_m+(P_{m+1}-P_m)/2, R_m+(R_{m+1}-R_m)/2)$ of the intermediate orientation. Accordingly, in this example, the processor 16 calculates the position data $((X_{m+1}-X_m)/2, (Y_{m+1}-Y_m)/2, (Z_{m+1}-Z_m)/2, W_m+(W_{m+1}-W_m)/2, P_m+(P_{m+1}-P_m)/2, R_m+(R_{m+1}-R_m)/2)$ of the intermediate position.

The processor 16 writes onto the storage device 18 (position data storing section 28) the thus acquired intermediate position data as the new target position data $(X_{m+2}, Y_{m+2}, Z_{m+2}, P_{m+2}, R_{m+2})$, together with a unique identifier ID=m+2. As a result, the (m+2)-th target position data $(X_{m+2}, Y_{m+2}, Z_{m+2}, W_{m+2}, P_{m+2}, R_{m+2})$, to which the identifier ID-m+2 is given, is added to the database of target position data, as shown in Table 5 below.

TABLE 5

| TARGET POSITION DATA | | | | | | |
|---|---|---|---|---|---|---|
| ID | X | Y | Z | W | P | R |
| 1 | $X_1$ | $Y_1$ | $Z_1$ | $W_1$ | $P_1$ | $R_1$ |
| 2 | $X_2$ | $Y_2$ | $Z_2$ | $W_2$ | $P_2$ | $R_2$ |
| 3 | $X_3$ | $Y_3$ | $Z_3$ | $W_3$ | $P_3$ | $R_3$ |
| . | . | . | . | . | . | . |
| . | . | . | . | . | . | . |
| . | . | . | . | . | . | . |
| m | $X_m$ | $Y_m$ | $Z_m$ | $W_m$ | $P_m$ | $R_m$ |
| m + 1 | $X_{m+1}$ | $Y_{m+1}$ | $Z_{m+1}$ | $W_{m+1}$ | $P_{m+1}$ | $R_{m+1}$ |
| m + 2 | $X_{m+2}$ | $Y_{m+2}$ | $Z_{m+2}$ | $W_{m+2}$ | $P_{m+2}$ | $R_{m+2}$ |

According to one example described above, $X_{m+2}=(X_{m+1}-X_m)/2$, $Y_{m+2}=(Y_{m+1}-Y_m)/2$, $Z_{m+2}=(Z_{m+1}-Z_m)/2$, $W_{m+2}=W_m$ (or $W_{m+1}$), $P_{m+2}=P_m$ (or $P_{m+1}$), and $R_{m+2}=R_m$ (or $R_{m+1}$). According to another example described above, $X_{m+2}=(X_{m+1}-X_m)/2$, $Y_{m+2}=(Y_{m+1}-Y_m)/2$, $Z_{m+2}=(Z_{m+1}-Z_m)/2$, $W_{m+2}=W_m+(W_{m+1}-W_m)/2$, $P_{m+2}=P_m+(P_{m+1}-P_m)/2$, and $R_{m+2}=R_m+(R_{m+1}-R_m)/2$.

Further, the processor 16 newly writes the operation instruction "MOVE POSITION [m+2]" onto the storage device 18 so as to insert between the n-th row of operation instruction "MOVE POSITION [m]" and the (n+1)-th row of operation instruction "MOVE POSITION [m+1]", in the database shown in Table 4. At this time, the processor 16 automatically gives the identifier "m+2" of the acquired (m+2)-th target position data to the operation instruction to be newly written.

As a result, the new operation instruction. "MOVE POSITION [m+2]" is added to the (n+1)-th row, as shown in Table 6 below. In this way, the operation defined by the new operation instruction "MOVE POSITION [m+2]" (i.e., the operation of arranging the end effector 110 at the (m+1)-th target position) is taught to the robot 100.

TABLE 6

| OPERATION INSTRUCTION | |
|---|---|
| 1 | MOVE POSITION [1] |
| 2 | MOVE POSITION [2] |
| 3 | MOVE POSITION [3] |
| . | . |
| . | . |
| . | . |
| n | MOVE POSITION [m] |
| n + 1 | MOVE POSITION [m + 2] |
| n + 2 | MOVE POSITION [m + 1] |

As described above, in the present embodiment, when the processor 16 adds the new operation instruction "MOVE POSITION [m+2]" between the n-th row of operation instruction "MOVE POSITION [m]" and the (n+1)-th row of operation instruction "MOVE POSITION [m+1]" shown in Table 4, the processor 16 acquires the position data of the intermediate position between the m-th target position and the (m+1)-th target position, and stores it onto the storage device 18 as the new (m+2)-th target position data ($X_{m+2}$, $Y_{m+2}$, $Z_{m+2}$, $W_{m+2}$, $P_{m+2}$, $R_{m+2}$).

The (m+2)-th target position thus-calculated as the intermediate position would not significantly deviate from the movement path of the robot 100 from the m-th target position to the (m+1)-th target position. Therefore, it is possible to enhance the safety of the operation of the robot 100 when moving from the m-th target position through the (m+2)-th target position and then to the (m+1)-th target position, while simplifying the work by the operator for correcting the added (m+2)-th target position. Further, since the (m+2)-th target position is automatically written onto the storage device 18, it is possible to reduce the work for teaching.

Note that the teach device 14 described above is not limited to a teaching pendant, but may be e.g. a desktop-type PC or mobile PC (tablet, notebook, etc.).

Furthermore, in the above described embodiment, the storage device 18 is built in the robot controller 12, and the processor 16 of the robot controller 12 functions as the position data writing section 30 and the operation instruction writing section 32. However, a robot teaching device including the storage device 18, the position data writing section 30, and the operation instruction writing section 32 may be provided separate from the robot controller.

Figure 3:
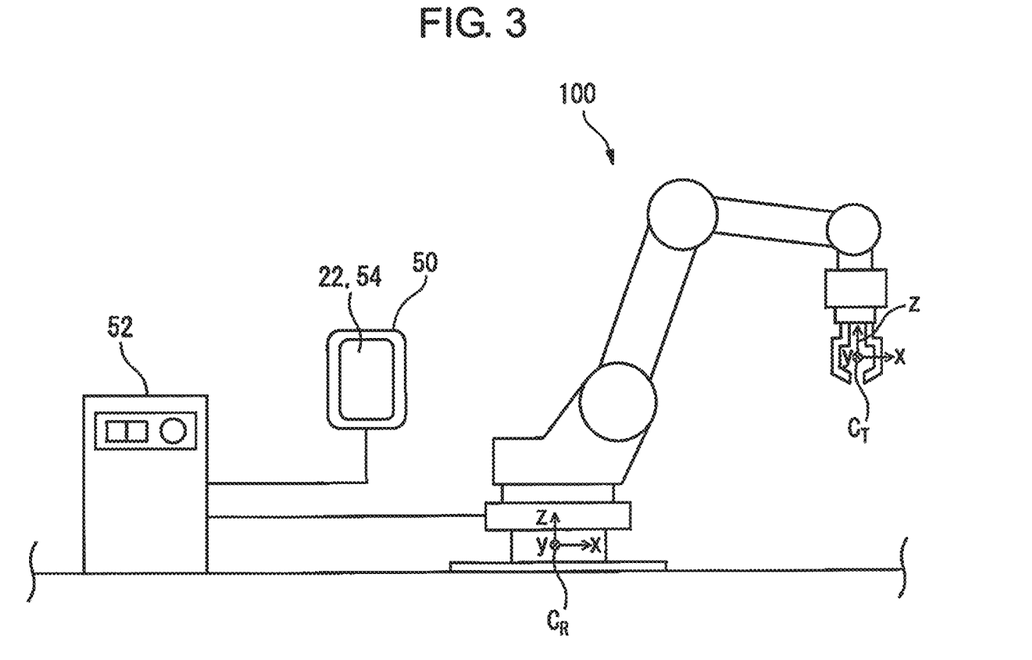
FIG. 3 is a diagram illustrating a robot teaching 10 device according to another embodiment.
Figure 4:
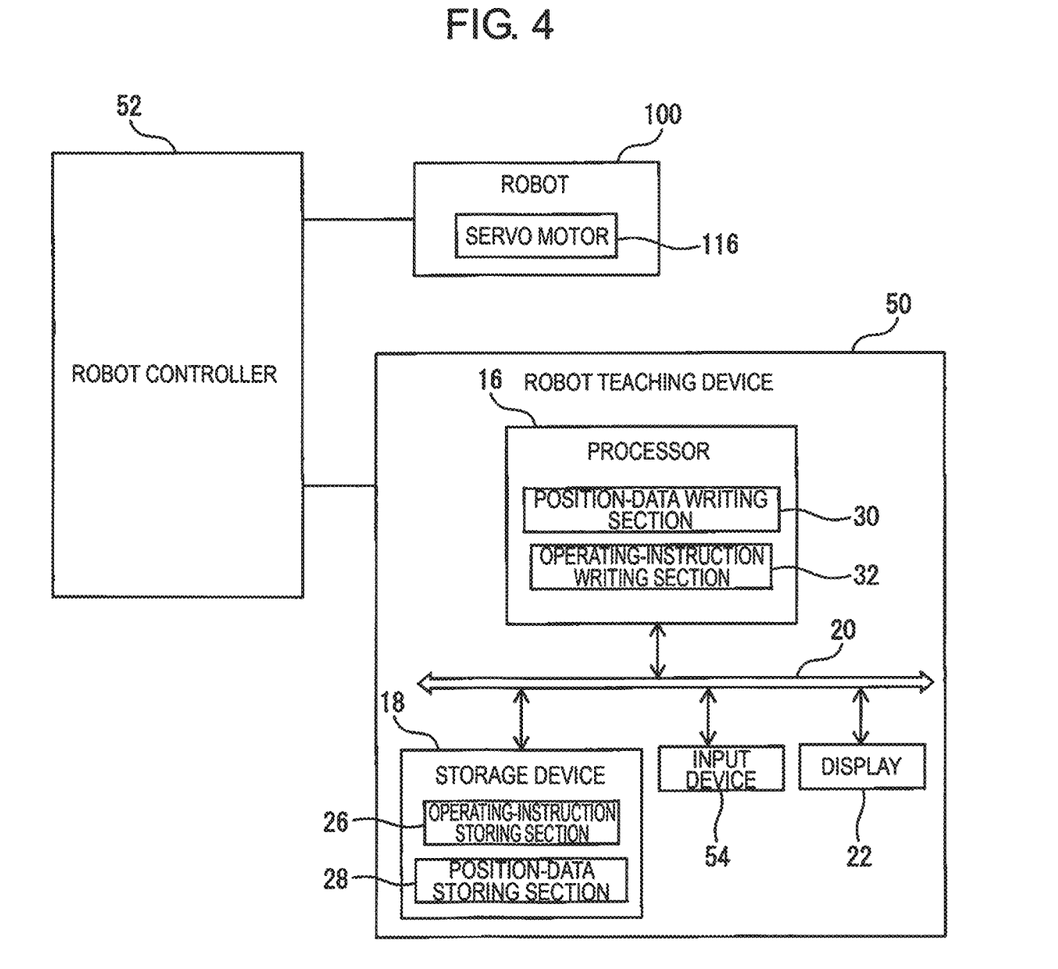
FIG. 4 is a block diagram illustrating the robot teaching device illustrated in FIG. 3.

Such an embodiment is illustrated in FIGS. 3 and 4. In this embodiment, a robot teaching device 50 is e.g. a mobile PC, and includes the processor 16, the storage device 18, the display 22, and an input device 54. The input device 54 is e.g. a touch sensor provided on the screen of the display 22, and receives contact-manipulation by an operator. The processor 16, the storage device 18, the display 22, and the input device 54 are communicably connected via the bus 20.

The robot teaching device 50 is connected to a robot controller 52 in a wireless or wired manner. The storage device 18 built in the robot teaching device 50 functions as the operation instruction storing section 26 and the position data storing section 28 described above. The processor 16 built in the robot teaching device 50 functions as the position data writing section 30 and the operation instruction writing section 32 described above.

Figure 5:
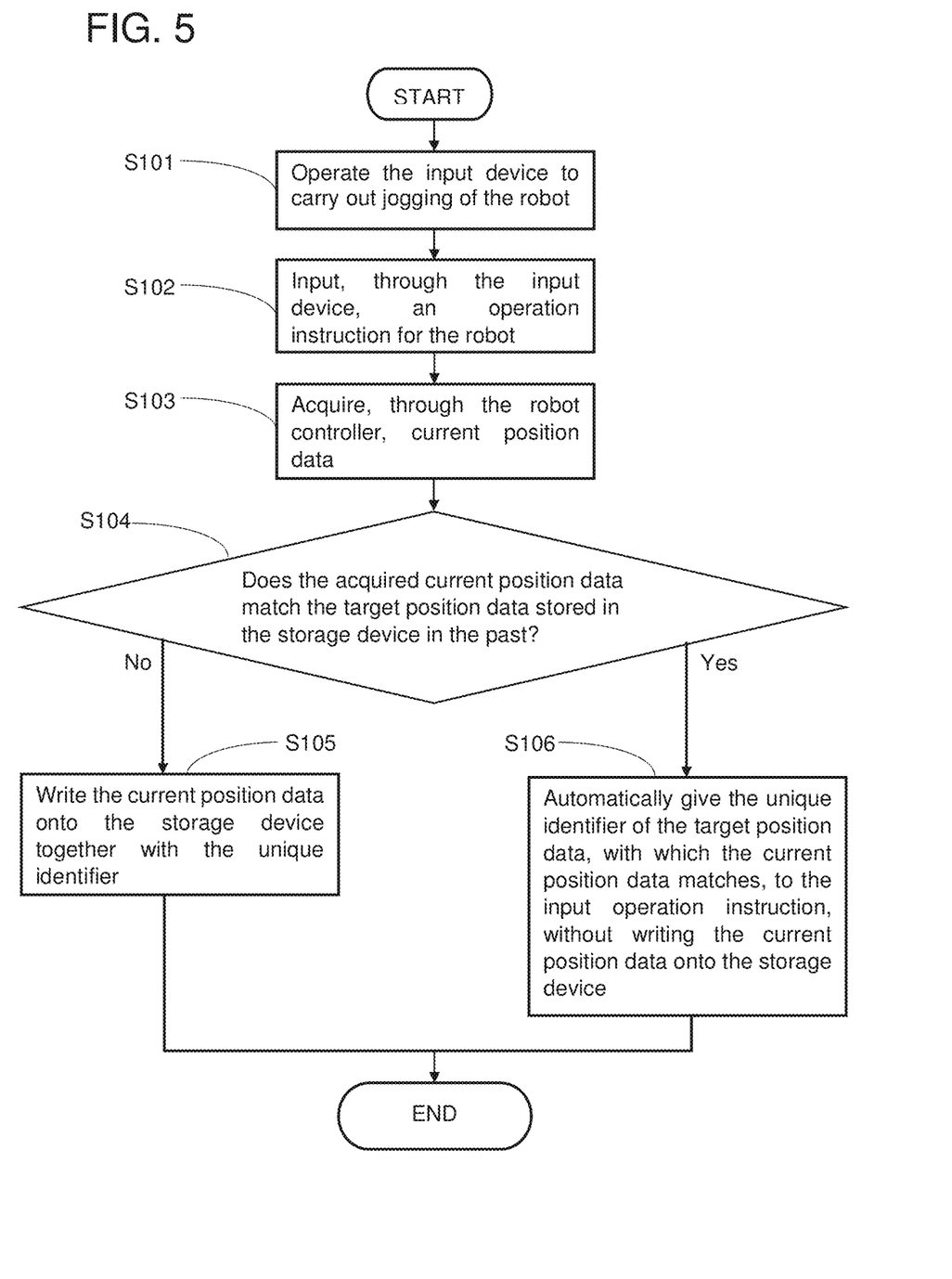
FIG. 5 is a flow chart of a method of teaching the robot teaching device.

Below, a method of teaching the robot 100 using the robot teaching device 50 will be described with reference to FIG. 5. First, at step S101, an operator operates the input device 54 to carry out jogging of the robot 100 via the robot controller 52 so as to arrange the end effector 110 at the target position to be taught.

The operator then, at step S102, operates the input device 54 to input an operation instruction for the robot 100. Upon receiving the input of the operation instruction to the input device 54, at step S103, the processor 16 of the robot teaching device 50 functions as the position data writing section 30 to acquire, via the robot controller 52, current position data ($X_{m+1}$, $Y_{m+1}$, $Z_{m+1}$, $W_{m+1}$, $P_{m+1}$, $R_{m+1}$) of the robot 100 at this time.

Then, at step S104, the processor 16 determines whether the acquired current position data ($X_{m+1}$, $Y_{m+1}$, $Z_{m+1}$, $W_{m+1}$, $P_{m+1}$, $R_{m+1}$) matches the target position data stored in the storage device 18 in the past. When the processor 16 determines that the acquired current position data ($X_{m+1}$, $Y_{m+1}$, $Z_{m+1}$, $W_{m+1}$, $P_{m+1}$, $R_{m+1}$) does not match the target position data stored in the past, the processor 16 function as the position data writing section 30 to write onto the storage device 18 the current position data ($X_{m+1}$, $Y_{m+1}$, $Z_{m+1}$, $W_{m+1}$, $P_{m+1}$, $R_{m+1}$) together with the identifier ID=m+1, see step S105.

On the other hand, at step S106, when the processor 16 determines that the acquired current position data ($X_{m+1}$, $Y_{m+1}$, $Z_{m+1}$, $W_{m+1}$, $P_{m+1}$, $R_{m+1}$) matches the target position data stored in the past, the processor automatically gives the identifier of the target position data, with which the current position data ($X_{m+1}$, $Y_{m+1}$, $Z_{m+1}$, $W_{m+1}$, $P_{m+1}$, $R_{m+1}$) matches, to the input operation instruction, without writing the current position data ($X_{m+1}$, $Y_{m+1}$, $Z_{m+1}$, $W_{m+1}$, $P_{m+1}$, $R_{m+1}$) onto the storage device 18.

Further, if the operator operates the input device 54 so as to add a new operation instruction to a row between the n-th row of operation instruction and the (n+1)-th row of operation instruction, the processor 16 of the robot teaching device 50 acquires position data of the intermediate position between the m-th target position and the (m+1)-th target position, and writes it onto the storage device 18 as a new (m+2)-th target position data ($X_{m+2}$, $Y_{m+2}$, $Z_{m+2}$, $W_{m+2}$, $P_{m+2}$, $R_{m+2}$), together with an identifier "m+2". According to this embodiment, it is possible to achieve the effects similar as the robot teaching device 10 described above.

Figure 6:
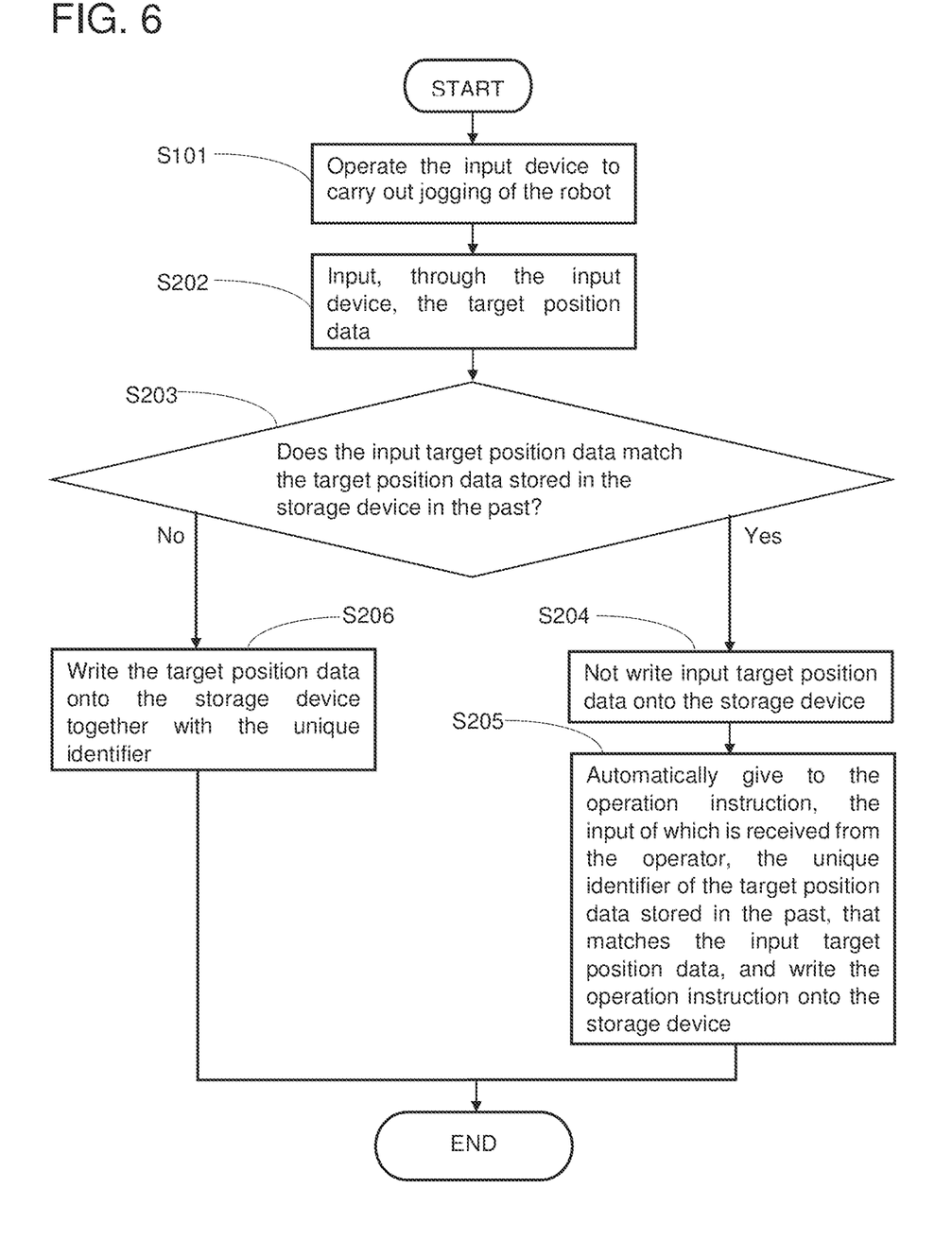
FIG. 6 is another flow chart of another method of teaching the robot teaching device.

A further method of teaching the robot 100 using the robot teaching device 50 will be described with reference to FIG. 6 which includes the same step S101 as in FIG. 5. Note that at step S202 in FIG. 6, in the robot teaching device 10, 50, the operator may operate the input device 24, 54 so as to manually input each coordinate of the target position data ($X_{m+1}$, $Y_{m+1}$, $Z_{m+1}$, $W_{m+1}$, $P_{m+1}$, $R_{m+1}$). In this case, at step S203, the processor 16 determines whether the input target position data ($X_{m+1}$, $Y_{m+1}$, $Z_{m+1}$, $W_{m+1}$, $P_{m+1}$, $R_{m+1}$) matches the target position data stored in the storage device 18 in the past.

When the processor 16 determines that the input target position data ($X_{m+1}$, $Y_{m+1}$, $Z_{m+1}$, $W_{m+1}$, $P_{m+1}$, $R_{m+1}$) matches the target position data stored in the past, the processor 16 does not write the input target position data ($X_{m+1}$, $Y_{m+1}$, $Z_{m+1}$, $W_{m+1}$, $P_{m+1}$, $R_{m+1}$) onto the storage device 18, see step S204. Then, at step S205, the processor 16 automatically gives to the operation instruction, the input of which is received from the operator, the identifier of the target position data stored in the past, that matches the input target position data ($X_{m+1}$, $Y_{m+1}$, $Z_{m+1}$, $W_{m+1}$, $P_{m+1}$, $R_{m+1}$), and writes it onto the storage device 18.

On the other hand, at step S206, when the processor 16 determines that the input target position data ($X_{m+1}$, $Y_{m+1}$, $Z_{m+1}$, $W_{m+1}$, $P_{m+1}$, $R_{m+1}$) does not match the target position data stored in the past, the processor 16 functions as the position data writing section 30 to write onto the storage device 18 the target position data ($X_{m+1}$, $Y_{m+1}$, $Z_{m+1}$, $W_{m+1}$, $P_{m+1}$, $R_{m+1}$) together with the identifier ID=m+1.

Note that the above-mentioned robot teaching device 50 may be e.g. a desktop PC. Further, the target position data is not limited to the above-described coordinates (X, Y, Z, W, P, R), but may be e.g. the rotation angle of each servomotor. Further, the identifier is not limited to the number, but may be any character or symbol.

Further, the storage device 18 may be provided outside of the robot controller 12 or the robot teaching device 50, instead of being built in the robot controller 12 or the robot teaching device 50. For example, the storage device 18 may be an external memory device (EEPROM, etc.) externally attached to the robot controller 12 or the robot teaching device 50, or may be built in an external server connected to the robot controller 12 or the robot teaching device 50 via a network. Further, each of the operation instruction storing section 26 and the position data storing section 28 may be constituted by one independent storage device.

Further, a plurality of robots 100 may be connected to the robot controller 12, 52 via a network, wherein the robot teaching device 10, 50 is configured to teach an operation to the plurality of robots 100. In this case, the database of the target position data and the data of the operation instructions may be shared among the plurality of robots 100. Moreover, the robot 100 is not limited to a vertical articulated robot, but may be any type of robot including a horizontal articulated type or parallel link type, etc.

While the present disclosure has been described through specific embodiments, the above-described embodiments do not limit the invention as defined by the appended claims.

The invention claimed is:

1. A robot teaching device, comprising:
   a position data storing section configured to store target position data for a robot;
   an operation instruction storing section configured to store an operation instruction for arranging the robot at a target position, the operation instruction including no target position data; and
   a position data writing section configured to:
      in response to the operation instruction being input, acquire current position data of the robot, and determine whether the current position data of the robot matches the target position data stored in the position data storing section, and
      in response to the current position data not matching the target position data stored in the position data storing section, write onto the position data storing section the current position data, as new target position data, together with a unique identifier,
   wherein the robot teaching device is configured to teach an operation to the robot by automatically giving the unique identifier of the target position data to the input operation instruction.

2. The robot teaching device according to claim 1, wherein, in response to the current position data newly acquired by the position data writing section matching the target position data stored in the past in the position data storing section,
   the position data writing section is configured to not write the new current position data onto the position data storing section, and
   the unique identifier of the target position data stored in the past is automatically given to the operation instruction for which the new current position data is acquired.

3. The robot teaching device according to claim 2, wherein, in response to the new current position data being within a range of thresholds predetermined for the target position data stored in the past, the position data writing section is configured to not write the new current position data onto the position data storing section.

4. The robot teaching device according to claim 2, further comprising an input device configured to, in response to the new current position data matching a plurality of target position data stored in the past in the position data storing section, receive input of selecting one of the plurality of target position data.

5. The robot teaching device according to claim 1, wherein
   when a first operation instruction and a second operation instruction among three operation instructions different from each other are taught and subsequently a third operation instruction of the three operation instructions is added between the first operation instruction and the second operation instruction, the position data writing section is configured to, in response to the third operation instruction being input:
      acquire position data of an intermediate position between a first target position instructed by the first operation instruction and a second target position instructed by the second operation instruction, instead of acquiring the current position data when the third operation instruction is input, and
      write onto the position data storing section the position data of the intermediate position, as the target position data, together with the unique identifier.

6. The robot teaching device according to claim 1, further comprising an operation instruction writing section configured to write onto the operation instruction storing section the operation instruction, to which the unique identifier has been automatically given, in the form of an operation instruction which includes no target position data.

7. The robot teaching device according to claim 1, further comprising:
   an operation instruction writing section configured to,
      in response to a newly-input target position data matching the target position data stored in the past in the position data storing section,
         automatically give to a new input operation instruction associated with the newly-input target position data the unique identifier of the matched target position data stored in the past, and
         write onto the operation instruction storing section the new input operation instruction in the form of an operation instruction which includes no target position data.

8. The robot teaching device according to claim 1, wherein
   the robot includes an end effector configured to perform a predetermined work on a workpiece, and
   the target position data defines a position of a tool coordinate system of the end effector to be set in a robot coordinate system of the robot when the end effector of the robot is arranged at the target position.

9. A robot teaching method, comprising:
   in response to an operation instruction for a robot being input, wherein the operation instruction includes no target position data for the robot,
   acquiring current position data of the robot, and determining whether the current position data of the robot matches target position data stored in the past;
   in response to the current position data not matching the target position data stored in the past, storing the current position data, as new target position data, together with a unique identifier; and
   teaching an operation to the robot by automatically giving the unique identifier of the new target position data to the input operation instruction.

10. The robot teaching method according to claim 9, wherein
    the robot includes an end effector configured to perform a predetermined work on a workpiece, and
    the target position data defines a position of a tool coordinate system of the end effector to be set in a robot coordinate system of the robot when the end effector of the robot is arranged at the target position.

11. A method, comprising:
    in response to an operation instruction for arranging a robot at a target position being input, wherein the operation instruction includes no target position data, acquiring current position data of the robot, and determining whether the current position data of the robot matches target position data stored in the past;

in response to the current position data not matching the target position data stored in the past, storing the current position data, as new target position data, together with a new unique identifier; and in response to a newly-input target position data matching the target position data stored in the past together with a unique identifier, automatically giving to a new input operation instruction associated with the newly-input target position data the unique identifier of the matched target position data stored in the past; and storing the new input operation instruction in the form of an operation instruction which includes no target position data.

12. The method according to claim 11, wherein the robot includes an end effector configured to perform a predetermined work on a workpiece, and the target position data defines a position of a tool coordinate system of the end effector to be set in a robot coordinate system of the robot when the end effector of the robot is arranged at the target position.

13. A robot teaching device configured to generate an operation program including a plurality of rows of operation instructions for arranging a robot at a plurality of target positions, respectively, to operate the robot, the robot teaching device comprising:

a position data storing section configured to store target position data for the robot;

an operation instruction storing section configured to store the operation program in which each operation instruction in the plurality of rows of the operation instructions includes no target position data;

a position data writing section configured to:

in response to a new operation instruction being input, acquire current position data of the robot, and determine whether the current position data of the robot matches the target position data stored in the position data storing section, and in response to the current position data not matching the target position data stored in the position data storing section, write onto the position data storing section the current position data, as new target position data, together with a unique identifier; and an operation instruction writing section configured to automatically give the unique identifier of the target position data to the new operation instruction, and write the new operation instruction onto a new row of the operation program such that the new operation instruction includes no target position data.

14. The robot teaching device according to claim 13, wherein the robot includes an end effector configured to perform a predetermined work on a workpiece, and the target position data defines a position of a tool coordinate system of the end effector to be set in a robot coordinate system of the robot when the end effector of the robot is arranged at the target position.

* * * * *